United States Patent
Varadarajan et al.

(10) Patent No.: US 10,242,421 B2
(45) Date of Patent: Mar. 26, 2019

(54) EFFICIENT PARALLEL ALGORITHM FOR INTEGRAL IMAGE COMPUTATION FOR MANY-CORE CPUS

(71) Applicant: Oracle International Corporation, Redwood Shores, CA (US)

(72) Inventors: Venkatanathan Varadarajan, Austin, TX (US); Arun Raghavan, Belmont, CA (US); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/470,673

(22) Filed: Mar. 27, 2017

(65) Prior Publication Data

US 2018/0276784 A1 Sep. 27, 2018

(51) Int. Cl.
*G06T 1/20* (2006.01)
*G06T 1/60* (2006.01)
*G06K 9/46* (2006.01)

(52) U.S. Cl.
CPC .............. *G06T 1/20* (2013.01); *G06K 9/4614* (2013.01); *G06T 1/60* (2013.01)

(58) Field of Classification Search
None
See application file for complete search history.

(56) References Cited

U.S. PATENT DOCUMENTS

| 7,506,134 | B1* | 3/2009 | Juffa | G06F 9/5038 |
| | | | | 712/16 |
| 9,645,855 | B2* | 5/2017 | Seo | G06F 9/505 |
| 2003/0142523 | A1* | 7/2003 | Biacs | G01C 21/005 |
| | | | | 365/1 |
| 2013/0243329 | A1* | 9/2013 | Oro Garcia | G06K 9/00973 |
| | | | | 382/195 |
| 2015/0160970 | A1* | 6/2015 | Nugteren | G06F 8/451 |
| | | | | 718/102 |
| 2016/0042246 | A1* | 2/2016 | Herrmann | G06K 9/00986 |
| | | | | 382/190 |

OTHER PUBLICATIONS

Viola, Paul, and Michael Jones. "Rapid Object Detection Using a Boosted Cascade of Simple Features." Computer Vision and Pattern Recognition, 2001, 9 pages.

(Continued)

*Primary Examiner* — Joni Richer
(74) *Attorney, Agent, or Firm* — Hickman Palermo Becker Bingham LLP

(57) ABSTRACT

Techniques are provided herein for generating an integral image of an input image in parallel across the cores of a multi-core processor. The input image is split into a plurality of tiles, each of which is stored in a scratchpad memory associated with a distinct core. At each tile, a partial integral image of the tile is first computed over the tile, using a Single-Pass Algorithm. This is followed by aggregating partial sums belonging to subsets of tiles using a 2D Inclusive Parallel Prefix Algorithm. A summation is finally performed over the aggregated partial sums to generate the integral image over the entire input image.

20 Claims, 8 Drawing Sheets

(56) References Cited

OTHER PUBLICATIONS

Venkata, Sravanthi Kota, et al. "SD-VBS: The San Diego vision benchmark suite." Workload Characterization, 2009. IISWC 2009. IEEE International Symposium on. IEEE, 2009, 10 pages, Oct. 2009. Park et al. "Tiling, block data layout, and memory hierarchy performance." IEEE Transactions on Parallel and Distributed Systems 14.7 (2003), 15 pages, Jul. 2003.
Nehab, Diego, et al. "GPU-efficient recursive filtering and summed-area tables." ACM Transactions on Graphics, TOG dated 2011.: http://hhoppe.com/recursive.pdf, 11 pages, Dec. 2011.
Mark Harris, Shubhabrata Sengupta, and John D. Owens: Parallel Prefix Sum (Scan) with CUDA, Ch. 39: Apr. 2007 http://http.developer.nvidia.com/GPUGems3/gpugems3_ch39.html, 16 pages.
Huang et al. "GPU-based Computation of the Integral Image." Virtual Reality and Visualization (ICVRV), 2011 International Conference on. IEEE, 2011, 4 pages. Ehsan et al., "Integral Images: Efficient Algorithms for Their Computation and Storage in Resource-Constrained Embedded Vision Systems." Sensors 15.7 (2015), 27 pages, Oct. 2015.
Bilgic et al. "Efficient integral image computation on the GPU." Intelligent Vehicles Symposium (IV), dated 2010 IEEE, 7 pages, Jun. 2010.

\* cited by examiner

EFFICIENT PARALLEL ALGORITHM FOR INTEGRAL IMAGE COMPUTATION FOR MANY-CORE CPUS

FIELD OF THE INVENTION

The present invention relates to computing the integral image for an image by employing an efficient parallel algorithm over a multi-core architecture.

BACKGROUND

Computer vision applications are becoming increasingly important as machine intelligence is being used to solve complex problems in fields ranging from remote sensing to medical data analysis to law enforcement and security. There is a great need for a scalable high-performance framework for processing computer vision workloads, with scalable and efficient algorithms for processing images, videos, and other types of unstructured data.

Integral image computation, sometimes referred to as summed area tables, is a critical component in computer vision computations, and is used in several computer vision applications. Determining the integral image of an input image facilitates other computer vision computations involving stereo vision, feature tracking, edge detection, image filtering, and object detection, among others. Hence, improving performance in computing the integral image has a direct impact on the performance of other computer vision applications.

Integral image computation involves determining the cumulative sum of all the pixels from the top left pixel of an input image to the bottom right pixel of the image. One approach to improving performance in computing the integral image involves parallelizing the computations.

Prior efforts to efficiently parallelize integral image computations use specialized embedded systems, or graphics processing units (GPUs). The approaches using GPUs either optimize memory accesses while ignoring the degree of parallelism achieved or aim for work-efficiency. The performance of GPU-based approaches are also mostly unaffected by regular non-sequential accesses across threads (i.e., with strided memory accesses). This is because GPU hardware inherently coalesces such memory accesses, and thereby provides the same benefits as sequential accesses. Modern commodity CPU hardware, however, still experience performance deterioration with regular non-sequential memory accesses. The challenge in integral image computation is to minimize non-sequential memory accesses, increase the degree of parallelism, and maintain a certain level of work efficiency.

Described herein are approaches for performing integral image computation in parallel across a large number of core processors with a maximum degree of parallelism without compromising work-efficiency, while fully utilizing available memory bandwidth and limiting non-sequential memory accesses to a minimum.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described to exploit the architecture of a multi-core processor to efficiently compute the integral image of an input image. In the multi-core architecture described herein, each core has a private "scratchpad memory". Each scratchpad memory may be a software managed cache with simple hardware Direct Memory Access (DMA) support. The scratchpad memories are used in a manner that parallelizes the computation across a number of cores with maximum degree of parallelism and without compromising work-efficiency.

The integral image of an image is the cumulative sum of all the pixels from the top left-most pixel to the bottom right-most pixel.

Figure 1:
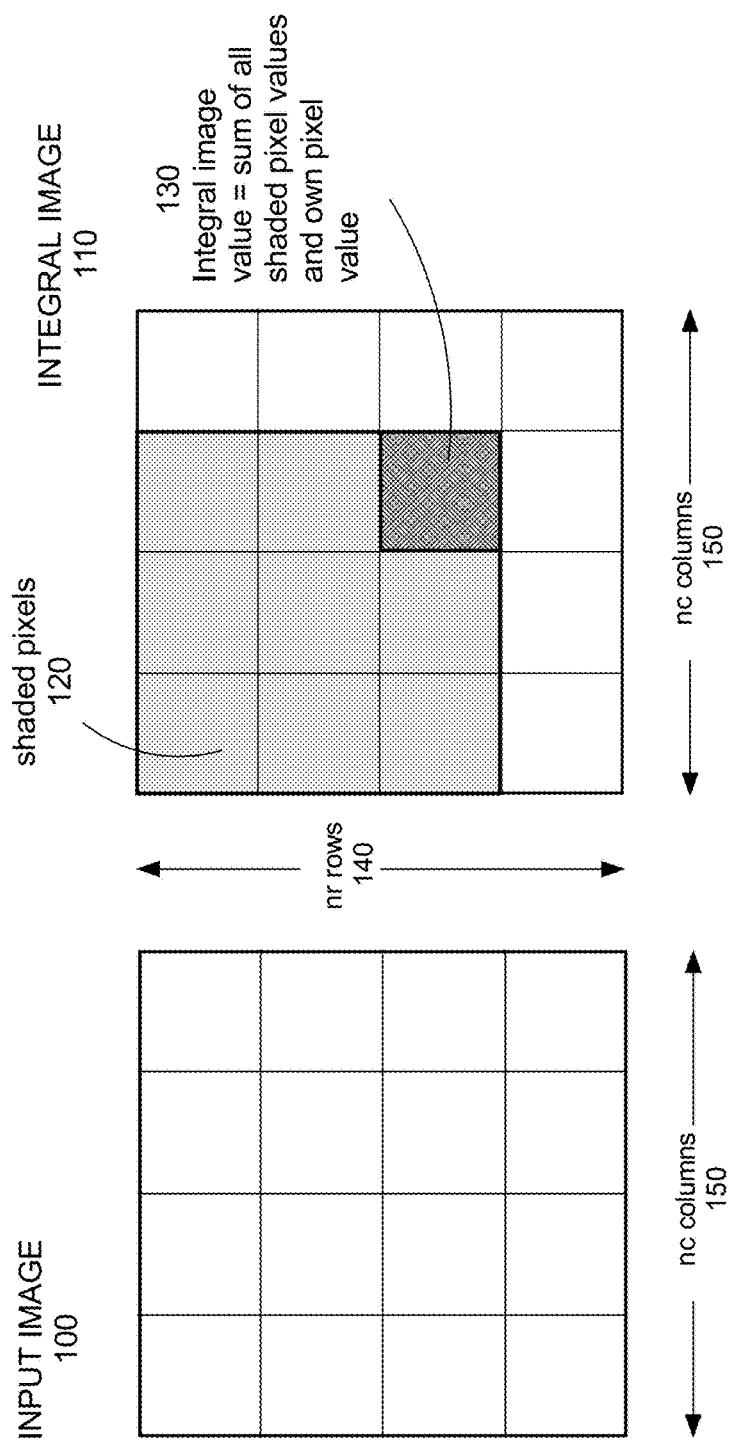
FIG. 1 is a diagram depicting an input image and its corresponding integral image according to an embodiment.

FIG. 1 depicts an Input Image 100 and an Integral Image 110 of Input Image 100. The input image has nr rows 140 and nc columns 150. The integral image also has the same nr rows 140 and nc columns 150. Each pixel of Input Image 100 is represented as a square in FIG. 1. In Integral Image 110, pixel 130 in Integral Image 110 contains the sum of all the shaded pixels 120 in the input image. A simple algorithm for computing the integral image, termed Two-Loop Sum, involves first computing the cumulative sum over pairs of rows followed by a subsequent loop computing the cumulative sum over pairs of column pixels in a row. The pseudo-code below depicts the Two-Loop Sum Algorithm for an input image of nr rows and nc columns.

```
integralImg=inputImg // copy
for (int i=1; i<nr; i++)
    for (int j=0; j<nc; j++)
        integralImg[i][j]+=integralImg[i−1][j];
```

```
for (int i=0; i<nr; i++)
    for (int j=1; j<nc; j++)
        integralImg[i][j]+=integralImg[i][j-1];
```
Two-Loop Sum Algorithm: Pseudo-Code Significant challenges arise in trying to parallelize this algorithm, including issues in memory bandwidth utilization, non-sequential memory access patterns, reducing parallelization overhead, and balancing work efficiency with the degree of parallelism. These are further described below:

Limited Memory Bandwidth: Computing the Integral Image is a memory bandwidth limited process as there is only one integer arithmetic operation per pixel (4 bytes or more) data. Hence, complex or highly optimized processors do not provide significant benefits unless the memory accesses are carefully orchestrated while computing the integral image.

Non-sequential Memory Access Patterns: In computing the integral images using a multi-core architecture, typically, an input image is split into sub-images, and the computations are correspondingly applied over the individual sub-images. A challenge here is to avoid non-sequential memory access when splitting the input image across threads or cores. Work may be evenly assigned to threads by assigning different sets of rows to each of the threads. But, in order to do a cumulative sum across rows and columns, neither splitting across rows nor columns is sufficient to remove any non-sequential memory accesses. That is, one of the two loops in the integral image computation of an image (refer Two-Loop Sum Algorithm: Pseudo-Code) that sum through rows and then over columns will under-utilize the available memory bandwidth by having non-sequential memory accesses, and thereby exacerbate the memory bottleneck.

Reducing Parallelization Overhead: The cost of parallelizing the integral image computations over a large number of cores takes mainly two forms: First is the indirect cost, which includes the additional rounds of communication or information exchange between threads (covered in the next point). Second is the direct cost that primarily includes the amount of synchronization (e.g. barriers, communication overhead via shared memory) between threads, which may increase with increasing number of cores. Keeping the cost of synchronization, especially system-wide barriers, to a minimum is essential for faster and more efficient parallel computations.

Hard Optimization Problem: Work-efficiency vs. Degree of Parallelism: Integral Image computation is not an embarrassingly parallel computation since it is impossible to avoid dependencies between threads. The challenge in Integral Image computation is to efficiently parallelize across cores. The inter-dependency between threads may be easily avoided by performing redundant computations in parallel. While this increases the degree of parallelism, it wastes effective work (i.e. increases work-inefficiency). Alternatively, this work-inefficiency can be avoided by reducing the degree of parallelism. In this case, certain parts of the code are executed sequentially in a single thread. This alternate approach may reduce power usage by avoiding redundant computation, but may not be faster (or energy efficient). Thus, it can be seen that integral image computation introduces a unique optimization problem—work-efficiency vs. degree of parallelism. A parallel algorithm is defined to be work-efficient when the parallel algorithm takes the same number of total operations as is required in the corresponding sequential algorithm. Hence, the challenging optimization problem is finding an approach that achieves work-efficiency and does not limit the degree of parallelism. An example of one such algorithm is referred to herein as the parallel prefix sum.

Some approaches use the parallel prefix sum to achieve work efficiency. In other approaches, utilized memory bandwidth is reduced significantly. A drawback is that some of the approaches compromise the degree of parallelism for work-efficiency by only parallelizing along the width and the height dimension of the image during some phases of the computation and not per block/tile. Furthermore, there is no caching the intermediate results particularly because, unlike in CPU-based systems, memory bandwidth is abundant in GPUs.

In an embodiment described herein, the integral image computation is performed by splitting the image into a number of non-overlapping tiles, and the computation is parallelized per tile of the image. This results in a quadratic increase in the degree of parallelism over parallelizing some phases of the computation along the height and width of the computation.

According to other embodiments described herein, the integral image computation is performed while fully utilizing the available memory bandwidth by keeping any strided or non-sequential access pattern to a minimum. This is performed by adapting the algorithm to use a special tiled row-major image in-memory representation. Furthermore, the algorithm does not rely on complex memory coalescing techniques, such as those that are available only on GPUs, to fully utilize memory bandwidth. A majority of the memory accesses in the kernel is done sequentially at memory bandwidth.

An embodiment described herein requires only two scans over the image: one scan while reading into a scratch pad memory that is associated with each core, and one scan for writing the final result out to the main memory.

An embodiment presented herein avoids any transpose of the entire image in order to benefit from sequential memory. Hence, the final integral image result does not need any additional transformations (e.g. a reverse-transpose). This significantly reduces the total number of memory accesses needed.

According to an embodiment presented herein, the parallel integral image computation is dynamically adaptable to varying sizes of the input for given hardware characteristics (e.g. scratch pad memory size).

The embodiments described herein assume a parallel many-core CPU that consists of a large number of simple cores. Each core has a small scratch pad memory with bandwidth to main memory split evenly across cores. The scratch pad memories can be filled using simple DMA requests, off-loading the memory access functionality out of the core. It is also assumed that the hardware may not have any memory coalescing capabilities that are typically built-into commodity GPUs.

Integral Image Computation

As previously noted with respect to FIG. 1, the integral image computation consists of doing cumulative summation across the diagonal of the image from top left to bottom right as graphically shown.

In computing the integral image of an image with dimension H×W on a single core, the goal is to compute the integral image in a single, sequential pass through the image from memory, potentially at memory bandwidth. This is done using the Single-Pass Sum Algorithm represented by the following pseudo-code. The pseudo-code shows the memory access pattern that enables streaming even a very large image through a scratch pad memory. It is assumed that the size of the cache is C bytes. The integral image array has the image pixel data stored in row major order in memory and is accessed sequentially through the columns of the first row to subsequent rows. The only requirement is that the previous row be continuously stashed in cache to calculate the cumulative sum within a column.

The Single-Pass Sum Algorithm is based on an input image of nr rows and nc columns, as shown in pseudo-code below:

```
integralImg=inputImg // copy
int prevRow[nc]; //scratch memory
set prevRow[0:nc]=0;
for (int=0; i<nr; i++)
    for (int j=0; j<nc; j++){
        if (j>0)
            integralImg[i][j]+=integralImg[i][j-1];
        integralImg[i][j]+=prevRow[j];
        prevRow[j]=integralImg[i][j];
    }
Single-Pass Sum: Pseudo-Code
```

Overall, the memory access pattern shown in the Single-Pass Sum Algorithm pseudo-code maximizes the use of memory bandwidth by using only sequential accesses through the entire image. A constraint that applies is that the size of the cache should be large enough to hold at least one complete row of pixels plus a constant to maximize the memory bandwidth with streaming. In other words, for an input image of dimension H×W, size of pixel, $$C > W*p + c \quad (1)$$

Here, p is the size of a pixel which is 4 bytes for an integer RGB representation, and c is the minimum size of the sequential memory requests to main memory that is essential to fully utilize the available memory bandwidth (in most off-chip memory systems, it is 256 bytes).

Image Tiling Scheme

Scratch pad memories are often limited in size as they are power hungry and expensive memory systems. Given that high-quality High Definition (HD) images are becoming more common, a full row of a typical image is too large to fit in these expensive scratch pad memories. In some embodiments, this restriction is overcome by splitting the input images into smaller tiles (this process is called tiling) of dimension $H_t \times W_t$. Note that tiling also enables splitting and distributing independent work across multiple cores/threads.

Figure 2:
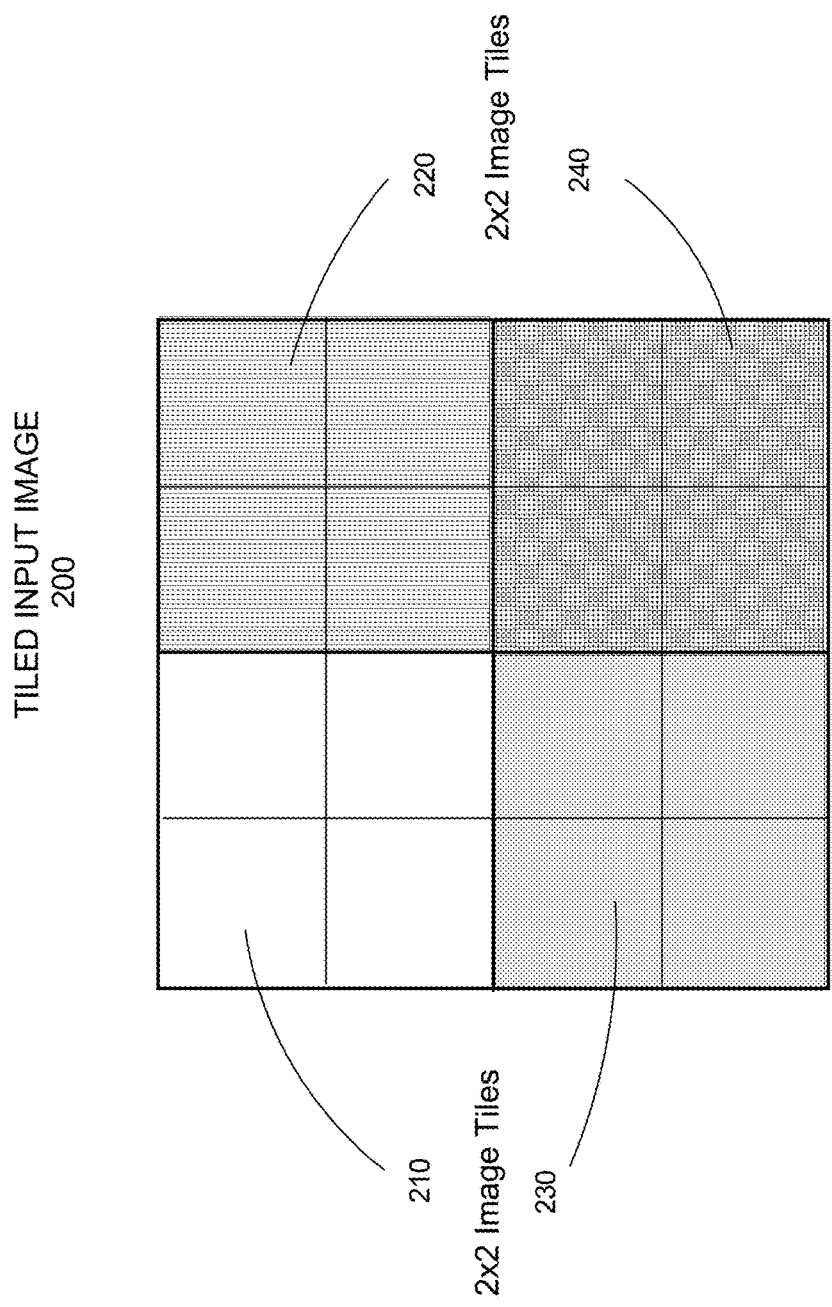
FIG. 2 is a diagram depicting an example of tiling over an input image according to an embodiment.

FIG. 2 depicts an example of tiling for a 4×4 image 200. Each tile 210, 220, 230, and 240 is a 2×2 sub-image of the entire input image 200. In this example, $H_t \times W_t$ is 2×2. Note that after tiling, the cache restriction in Equation (1) becomes:

$$C > W_t*p + c \quad (2)$$

Here, $W_t \ll W$ which can be configured for a given input image size and hardware restrictions (number of cores or threads and the scratch pad memory size C).

Tiling on both dimensions (height and width) of the input image is necessary to work around the cache size restriction. However, in performing such tiling along the two dimensions, the problem of non-sequential access arises. If the whole image is stored in row-major order, memory access to a tile's rows (and columns) require a constant stride (equal to the number of columns to the right of the right-most column of the tile) making it non-sequential. This is resolved using a hybrid in-memory tile representation of the image. In such a hybrid representation, the tiles are themselves in row major order, and each tile is in contiguous shared memory. With this in-memory representation of images using the scratchpad, and with a preconfigured tile size, the Single-Pass Sum Algorithm is applied to the tiled image on each core. This representation allows more utilization of sequential accesses without requiring memory coalescing hardware support.

Aggregating the Partial Sums Over Multiple Tiles

After computing the integral image on each tile in parallel, each thread collects sufficient information from the other tiles to arrive at the final result. The relevant information that needs to be collected for a single tile is depicted in FIG. 3.

Figure 3:
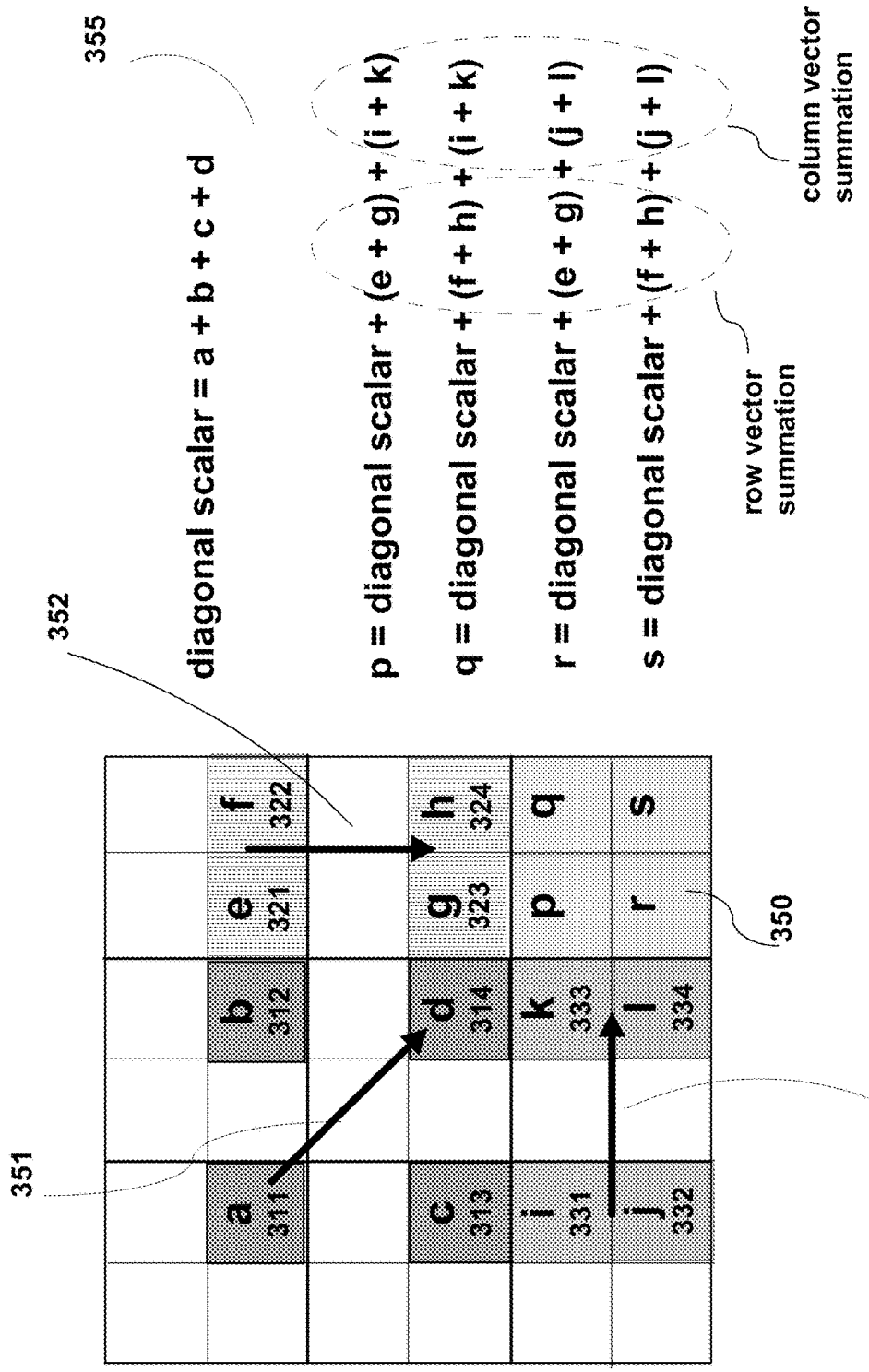
FIG. 3 is a diagram depicting the neighboring tile integral image values that contribute to determining the integral image of a tile in an image according to an embodiment.

FIG. 3 depicts the neighboring tile integral image values that contribute in determining the integral image of the tile 350 in FIG. 3. The partial sums required to be aggregated in order to arrive at the final result of the integral image for tile 350 are the intermediate results in three pixel groups, i.e., (311, 312, 313, 314), (321, 322, 323, 324), and (331, 332, 333, 334). The intermediate partial sum of pixels 311, 312, 313, and 314 is the diagonal scalar, the intermediate partial vector-sum of the pixels 321, 322, 323, and 324 is the row vector, and the intermediate partial vector-sum of the pixels 331, 332, 333, and 334 is the column vector.

With an efficient algorithm to compute the row vector, the column vector, and the diagonal scalar, the integral image of the tile portion 350 is computed using the Single-Pass Sum algorithm with the following minor modification: Instead of caching the previous row as in the Single-Pass Sum, the row vector is cached. The column vector is directly read from the scratch pad memory per row. The diagonal scalar, the corresponding partial sum in the row vector, and the corresponding cached partial sum in the column vector are added to the current shaded tile. Note that the partial sums are aggregated only along the directions shown by the arrows 351, 352, and 353. Thus, the diagonal scalar is added to all pixels of the shaded tile 340, but the row vector is added to only the corresponding row pixels of the tile, and the column vector is added only to the corresponding column pixels of the tile, as shown in 355.

These additions are also depicted in FIG. 3, for integral image values (a, b, c, d) corresponding to pixels (311, 312, 313, 314), integral image values (e, f, g, h) corresponding to pixels (321, 312, 313, 314) that correspond to the row vector values, and integral image values (i, j, k, l) corresponding to pixels (331, 332, 333, 334) that correspond to the column vector values. These values are used to compute the individual integral image values (p, q, r, s) of shaded tile 340. Thus, as shown in FIG. 3, $$\text{diagonal scalar} = a+b+c+d \quad (3)$$

$$\begin{aligned}
p &= \text{diagonal scalar} + (e+g) + (i+k) \\
q &= \text{diagonal scalar} + (f+h) + (i+k) \\
r &= \text{diagonal scalar} + (e+g) + (j+l) \\
s &= \text{diagonal scalar} + (f+h) + (j+l)
\end{aligned} \quad (4)$$

From Equations 3 and 4, it follows that the intermediate values are the values of the diagonal scalar (i.e., [a+b+c+d]), the row vector partial sum (i.e., [(e+g), (f+h)]), and the column vector partial sum (i.e., [(i+k), (j+l)]).

The challenge is in optimizing the algorithm for efficiently accumulating the three partial sums, such as described above, i.e.:

Row vector partial sum,
Column vector partial sum, and
Diagonal scalar.

A straight-forward way to compute these values is collect them individually per thread. This approach is work inefficient because the last tile does all the additions done by all the other tiles, and does not fully utilize the available parallelism. However, although this approach is work-inefficient, it can be faster when the input image sizes are small as it avoids the relatively high synchronization overheads (e.g. barriers).

The algorithm description that follows is for the case when both the image sizes and the cores available in hardware are significantly higher (i.e. HD images that are 4 MB with 16+ cores).

Parallel Prefix Sum Algorithm

The parallel algorithm for integral image computation is based on the parallel prefix sum algorithm described in Mark Harris, Shubhabrata Sengupta, and John D. Owens: *Parallel Prefix Sum (Scan) with CUDA, NVIDIA, In GPU Gems* 3 (12 Aug. 2007) Ch. 39, (hereinafter "Harris"). This parallel prefix sum algorithm is both work efficient (O(n) additions) and has a logarithmic step complexity, i.e $O(\log_w n)$ steps, where w is the width of the tree (usually $w_w=2$, i.e., binary tree). The algorithm determines the prefix-sums operation on a single array of data. It describes a work-efficient parallel scan of the array using a balanced binary-tree data structure. The algorithm operates along two phases—a reduce phase that is an up-sweep phase, followed by a down-sweep phase. In the up-sweep, the tree is traversed from leaves to root computing partial sums and storing them at internal nodes. Upon completion of the up-sweep, the root node of the tree will hold the sum of all the nodes in the array. In the down-sweep, the tree is traversed back down to the leaves from the root using the partial sums computed and stored from the up-sweep to determine the individual elements in the prefix sum of the array.

In embodiments described herein, the parallel prefix sum algorithm is modified to be employed along two dimensions, simultaneously. In order to compute the row and column vectors, each thread responsible for a tile participates in a parallel prefix sum calculation both along its row and its column. The modified algorithm is termed the Two-Dimensional Inclusive Parallel Prefix Sum (2D-IPPS) Algorithm.

Figure 4:
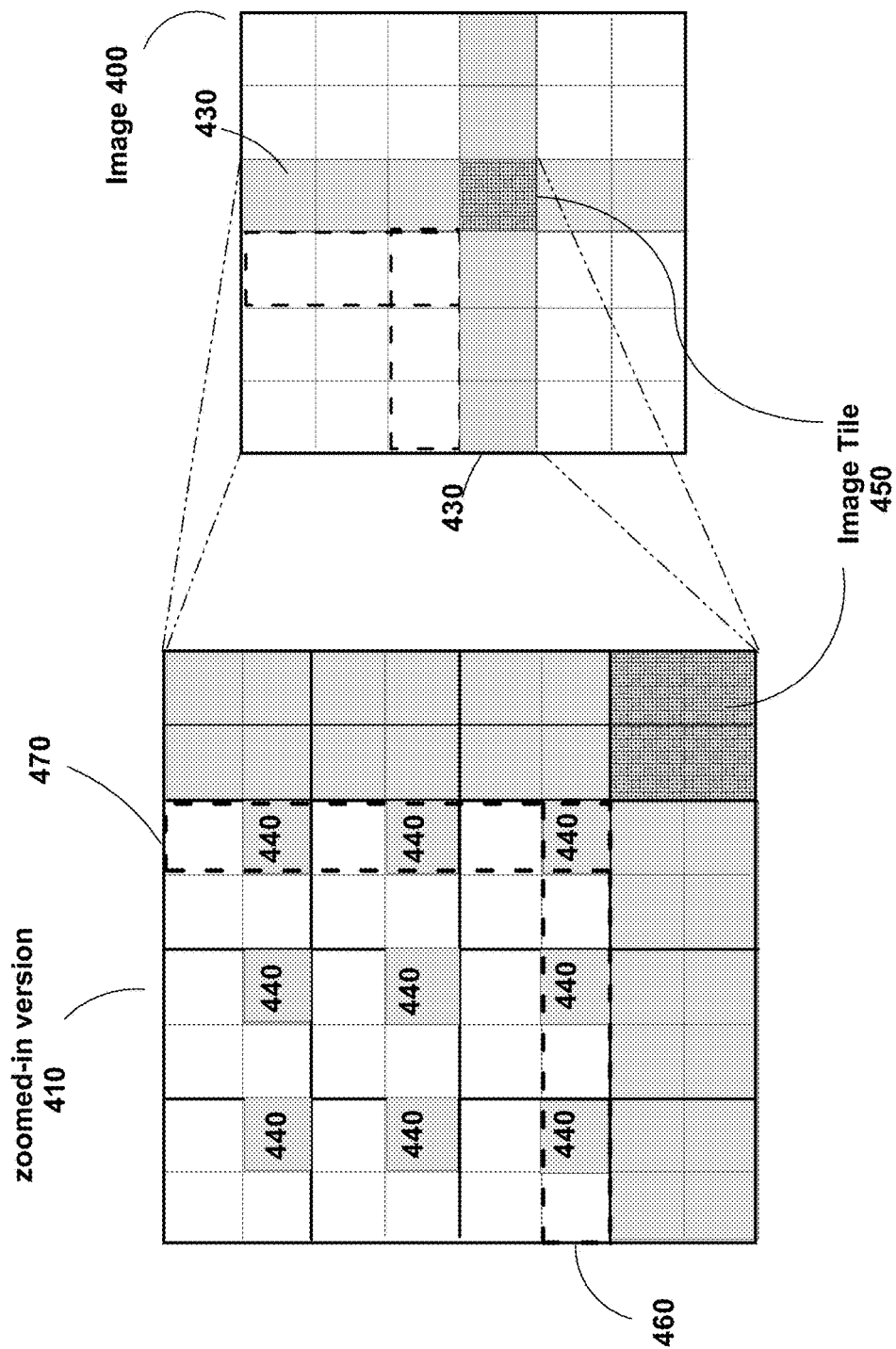
FIG. 4 is a diagram depicting a tiled image and a zoomed-in version of a portion of a tile according to an embodiment.

The 2D-IPPS computation is depicted in FIG. 4. FIG. 4 depicts a tiled Image 400 and a zoomed-in version of a portion of the tile 410. The thread responsible for tile 450 participates in the parallel prefix sum with the respective threads whose tiles fall in the shaded region 430. Hence, there are $$\frac{W}{W_t} + \frac{H}{H_t}$$

total parallel prefix computations happening, one in each direction. As shown, the parallel prefix sum (of vectors) along both the column and the row direction can happen simultaneously as their respective results are stored in separate memory locations per thread. Hence the number of steps of this part of the 2D-IPPS algorithm follows $$O\left(\log_w \max\left(\frac{W}{W_t^T}, \frac{H}{H_t}\right)\right)$$

complexity. That is, the number of levels in the parallel prefix tree depends on the larger dimension of the image. Note that the number of barriers between cores also follow the same complexity as above.

To compute the diagonal scalar, the column (or row) vectors computed in the previous step are used. This process is pictorially represented in FIG. 4 on the zoomed-in version 410. The sum of the shaded pixels 440 that result in the diagonal scalar can be computed by adding the last element in the row 470 (or column 460) vectors in the dotted region. As earlier, it is possible to use the scalar version of the 2D-IPPS algorithm to compute the diagonal scalar in parallel across the threads or each thread could sequentially compute the diagonal scalar avoiding the synchronization overhead but reducing work-efficiency. When the parallel prefix sum is used, the complexity is $$O\left(\log \min\left(\frac{W}{W_t^T}, \frac{H}{H_t}\right)\right)$$

without compromising work-efficiency. Since there is a choice between the row or column vectors to compute the diagonal scalar, the dimension of the row and the column vectors is used to make the choice—the vector corresponding to the shorter dimension of the two is used to complete the sum faster. This concludes the steps required to gather all the information required to compute the final integral image.

The pseudo code for row and column vector aggregation using the 2D-IPPS algorithm is shown below. Note that in the pseudo code, array indices start from 0, and while the scratch pad memory is used to perform the partial row/column additions, system-wide barriers are used to publish the partial row/column sums to the shared memory.

2D Inclusive Parallel Prefix Sum Algorithm: Pseudo-Code

```
int parRowSum[T][Ht];    // partial row vectors per thread
int parColSum[T][Wt];    // same for col vectors
// copy prev stage result into per tile row/col vector
// parallel_prefix sum over my row and my column
// Jo/down tree with max(W/Wt,H/Ht) levels
for(stride = 1; stride <= max(W/Wt,H/Ht); stride*=2)
  {
    // Am : participating in this level?
    if (my_row_id) participate in this level (
      // find tile row/col vector for this level to add
      row_tile_2add = tile_id(my_row_id - stride, my_col_id);
      // add tiles if tile_id is valid
      add parRowSum[row_tile_2add] into parRowSum[mytid];
    }
    if (my_col_id+1) participate in this level {
      col_tile_2add = tile_id(my_row_id, my_col_id - stride);
      // add tiles if tile_id is valid
      add parColSum[col_tile_2add] into parColSum[mytid];
    }
    barrier( );
  }
// do down sweep
for(stride = max(W/Wt,H/Ht)/2; stride > 0; stride/=2)
  {
    // add to the left
    if (my_row_id participate in this level and my_row_id < (H/Ht)/2 {
      // find tile row/col vector for this level to add
      row_tile_2add = tile_id(my_row_id + stride, my_col_id);
      add parRowSum[mytid] into parRowSum[row_tile_2add];
    if (my_col_id) participate in this level and my_col_id < (W/Wt)/2{
      col_tile_2add - tile_id(my_row_id, my_col_id - stride);
      add parColSum[mytid]into parColSum[col_tile_2add];
    }
    barrier( );
  }
```

-continued

2D Inclusive Parallel Prefix Sum Algorithm: Pseudo-Code

// parallel prefix to find diagonal scalar per tile
Diagonal scalar[T] = Parallel_Prefix_Sum(parColSum[0:T][Wt−1]) or
    Parallel_Prefix_Sum(parRowSum[0:T][Ht−1])

Note that in the pseudo-code, array indices start from 0, and while the scratch pad memory is used to perform the partial row/column additions, these scratch pad memories of the cores do not communicate with each other. Hence, each stage of the 2D-IPPS algorithm shown above is followed by using barriers to publish the partial row/column sums to synchronize the results to shared memory.

Note that, as used in the pseudo-code above, barriers are a synchronization method employed in parallel computing. When a system-wide barrier is set for a group of processes or threads, it means that all the threads or processes must stop at this point, and cannot proceed until the other threads or processes reach this point as well. Thus, at every stage of the up-phase and the down-sweep phase, each participating core process waits until completion of the stage for all the other participating core processes.

In summary, the complete algorithm to compute the integral image over a given input image of dimension (H×W) in parallel over N cores or threads consists of the following three operations: (i) splitting the input image into tiles, (ii) computing partial integral image over each tile using the Single-Pass algorithm, (iii) collecting partial cumulative sum from neighbor tiles using the 2D-IPPS algorithm, and (iv) performing a final pass applying the Single-Pass algorithm to the partial sums.

Figure 5:
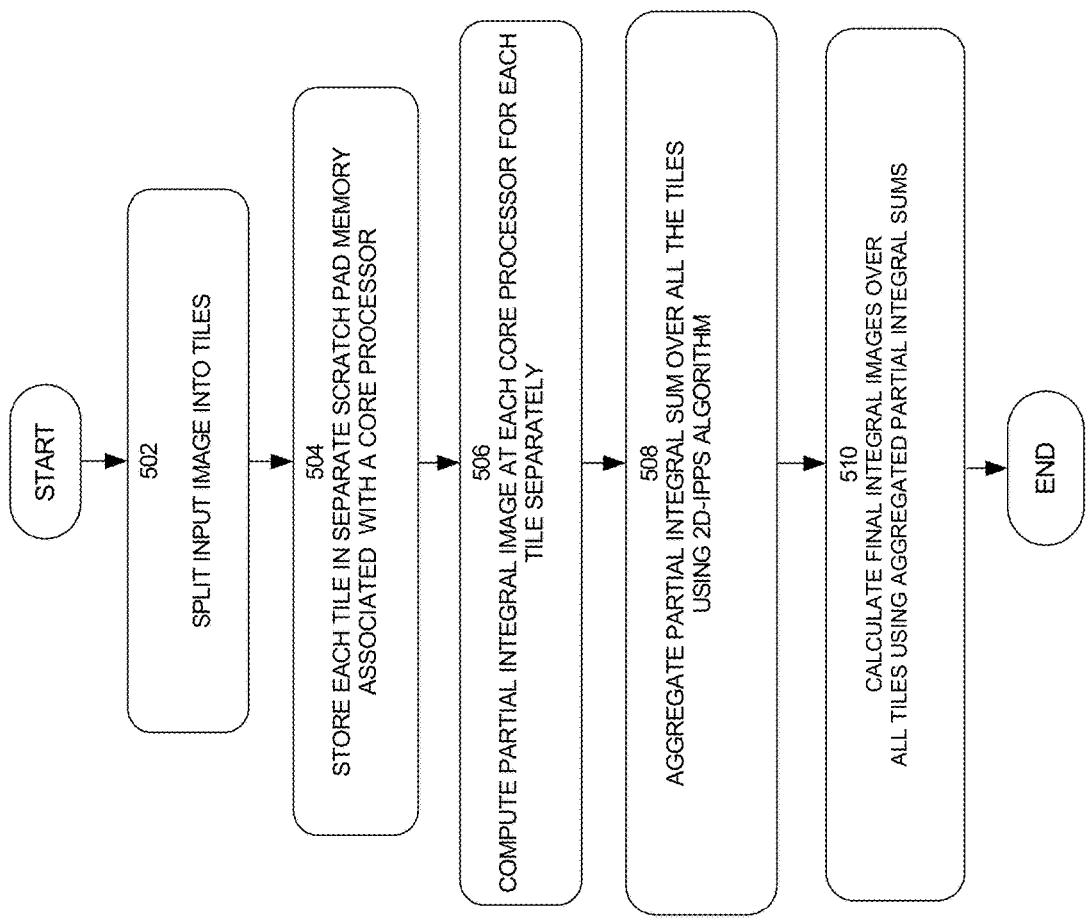
FIG. 5 is a diagram depicting a flow chart of operations that are performed for computing the integral image according to an embodiment.

FIG. 5. depicts the flow chart of the above three operations in computing the integral image.

In the first operation, 502, the input image H×W image is split into tiles.

In the next operation, 504, each tile is stored in a scratch pad memory associated with a core processor.

In the next operation, 506 each core independently computes the partial integral image over its own tile using the Single-Pass Algorithm. The size of a tile ($H_t \times W_t$) is determined based on hardware constraints, including the size of the scratch pad memory that is associated with each core.

In the next operation, 508, since each core only computes the integral image over its own tile, in order to compute the integral image within a particular tile over the whole image, intermediate partial sums of integral image values are aggregated from a set of neighboring tiles on which the integral sum for pixels in the particular tile depends. In particular, the intermediate partial sums are the cumulative sums across rows/columns of neighboring tiles as well as diagonal values from neighboring tiles—computed using the 2D-IPPS algorithm.

In the final operation, 510, after aggregating the intermediate results from other tiles, the final pass over each tile is performed using the Single-Pass algorithm to apply the aggregated partial sums to each tile, and to write back into shared memory.

Complexity Analysis

In order to evaluate the computation presented in embodiments herein, the metrics used to evaluate the efficiency of the computation relative to the prior state-of-the-art parallelization efforts of the integral image kernel are:

Algorithm complexity
Synchronization complexity
Work-efficiency vs. Degree of Parallelism
Memory bandwidth utilization An optimized version of the integral image computation should efficiently use the memory bandwidth by predominantly accessing memory in ways that do not waste the bandwidth to the main memory (e.g. memory bandwidth is maximized when accessed sequentially). Since it is assumed that there is no specialized hardware to coalesce memory access (e.g. available in GPUs), any strided (i.e. with a constant offset like every 64 bytes) or random access to memory will reduce memory bandwidth utilization. This is an important metric to optimize in the integral image computation as it is highly memory intensive (i.e. very limited computations per pixel). Specifically, the percentage of bytes that are accessed non-sequentially during the integral image computation is used in evaluating for this metric.

The number of system-wide barriers required in integral image computation are also counted. The barriers are synchronizations essential for correctness of the algorithm. This is an important metric as the overhead associated with a system-wide barrier is the one of the major costs of parallelism, especially when the number of cores in the system is large (>=32). And, as mentioned earlier, the trade-off between work-efficiency and degree of parallelism is important for parallelizing integral image and it can be validated by analyzing the parallel algorithm.

Putting all the steps of the integral image computation together, the following metrics are reached for the algorithm. For simplicity, it is assumed that the tiles are split homogeneously with size d×d and there are t×t tiles. That is $$d = H_t = W_t; t = \frac{W}{d} = \frac{H}{d} = \frac{D}{d}.$$

the number of steps in the proposed integral image algorithm per thread is $$2d^2 + \frac{(2d+1)\log t}{d^2}.$$

Here the algorithm only scans the image twice, once when reading input into the scratch pad memory, and then for writing the final results. The second term constitutes the average number of steps required to aggregate the partial sums from neighboring tiles per tile. The term (2d+1)log t is the number of steps to gather the diagonal scalar, and the row and column vectors. Overall, the complexity is $O(2d^2 + 2d \log t + \log t) = O(d^2 d \log t + \log t)$ with $t^2$ threads. The total amount of memory accesses in the integral image kernel is $2D^2 + 4Dt + 2t^2$.

Figure 6:
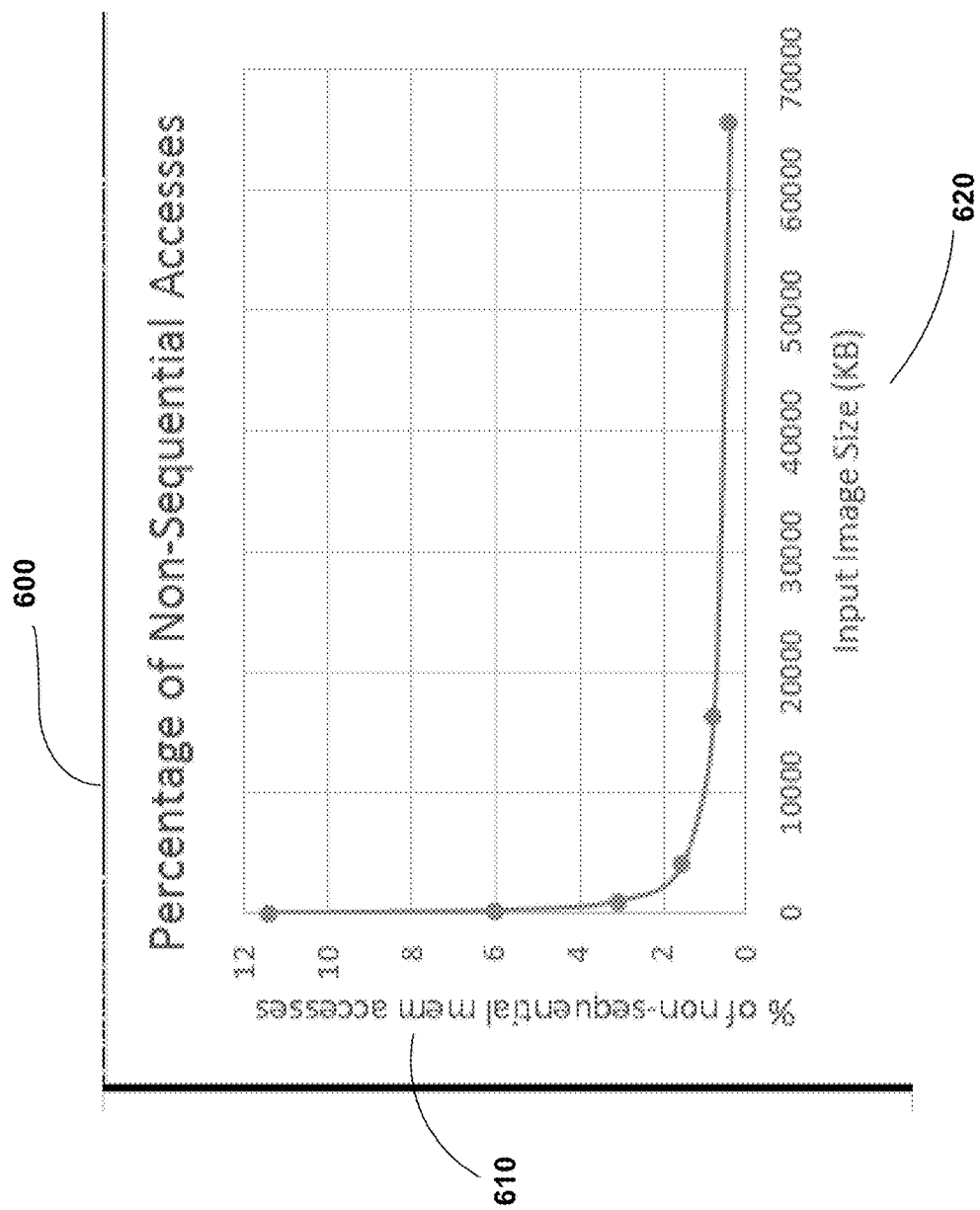
FIG. 6 is a graphical depiction of the percentage of non-sequential memory accesses in relation to image size for the integral image algorithm according to an embodiment.

FIG. 6 is a graphical depiction 600 of the Percentage of Non-Sequential Memory Accesses 610 corresponding to Input Image Size 620 for the integral computation algorithm described herein. It can be seen that non-sequential memory access is a very insignificant fraction of the total memory access, especially with larger images.

Overall, the efficiency of the algorithm is significantly improved by parallelizing integral image computation with high degree of parallelism with minimal overhead due to barrier synchronization and non-sequential memory accesses.

Multi-Core Processor and Scratchpad Memory

A multi-core hardware processor (also referred to herein as a multi-core processor) comprise multiple core processors on the same chip, each core processor ("core") being capable of separately executing a machine code instruction within the same clock cycles in which another of the multiple cores executes an instruction. Each core processor may be electronically coupled to a scratch pad memory that cannot be accessed by any other core processor of the multiple core processors.

Each core is coupled to registers and electronically configured to execute an instruction set based on the registers. Instructions from the set when executed by the core cause the core to generate a result using data in one or more registers as input, and to store the result in one of the registers. Some instructions in the instruction set, when executed by a core, cause the data to read from addressable memory to a register and/or to store data from a register to addressable memory. Addressable memory is memory which can be referenced by an instruction in the set (e.g. by referring to a register holding a memory address) and which, when executed by a core, causes the core to load data from that memory address to a register or store data from a register to that address. Addressable memory includes scratch pad memory or main memory. Addressable memory may be referred to herein as software-managed memory because instructions in the set may explicitly reference these addresses.

A scratch pad memory, also known as a scratch pad RAM or a software-managed cache, refers to a high-speed addressable internal memory used for temporary storage of small data for rapid retrieval. Similar to an L1 cache, a scratch pad memory is positioned close to the core registers, and offer rapid retrieval of data stored within. A scratch pad memory stores temporary results generated mid-computation by the core, results that may often not need to be committed to main memory. Thus, they differ from cache memory in that scratch pad memory data is not always copied into main memory. Furthermore, unlike typical cache management, which is performed by the hardware, scratch pad memory management is under the control of software instructions. This makes using a scratch pad memory preferable to L1 caches in applications where predictable timing is desirable, such as in real-time application.

In some architectures that employ cache control instructions, a cache may be made to behave like a scratch pad memory. Embodiments described herein are applicable using both scratch pad memories under programmer control or cache systems that can be made to behave like a scratch pad memory providing programmer control for objects stored in the cache.

Software Overview

Figure 7:
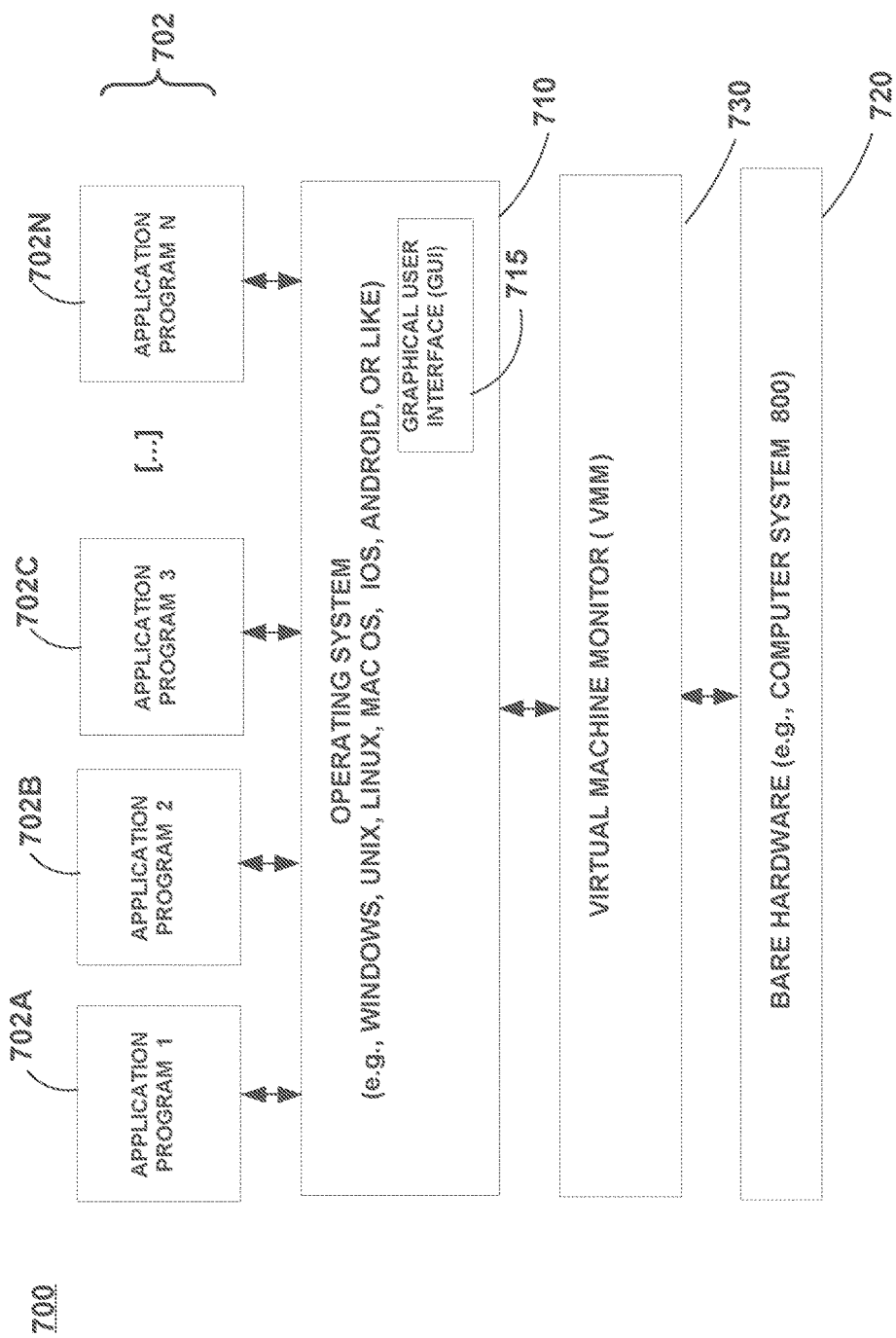
FIG. 7 is a diagram depicting a software system that may be used in an embodiment.
Figure 8:
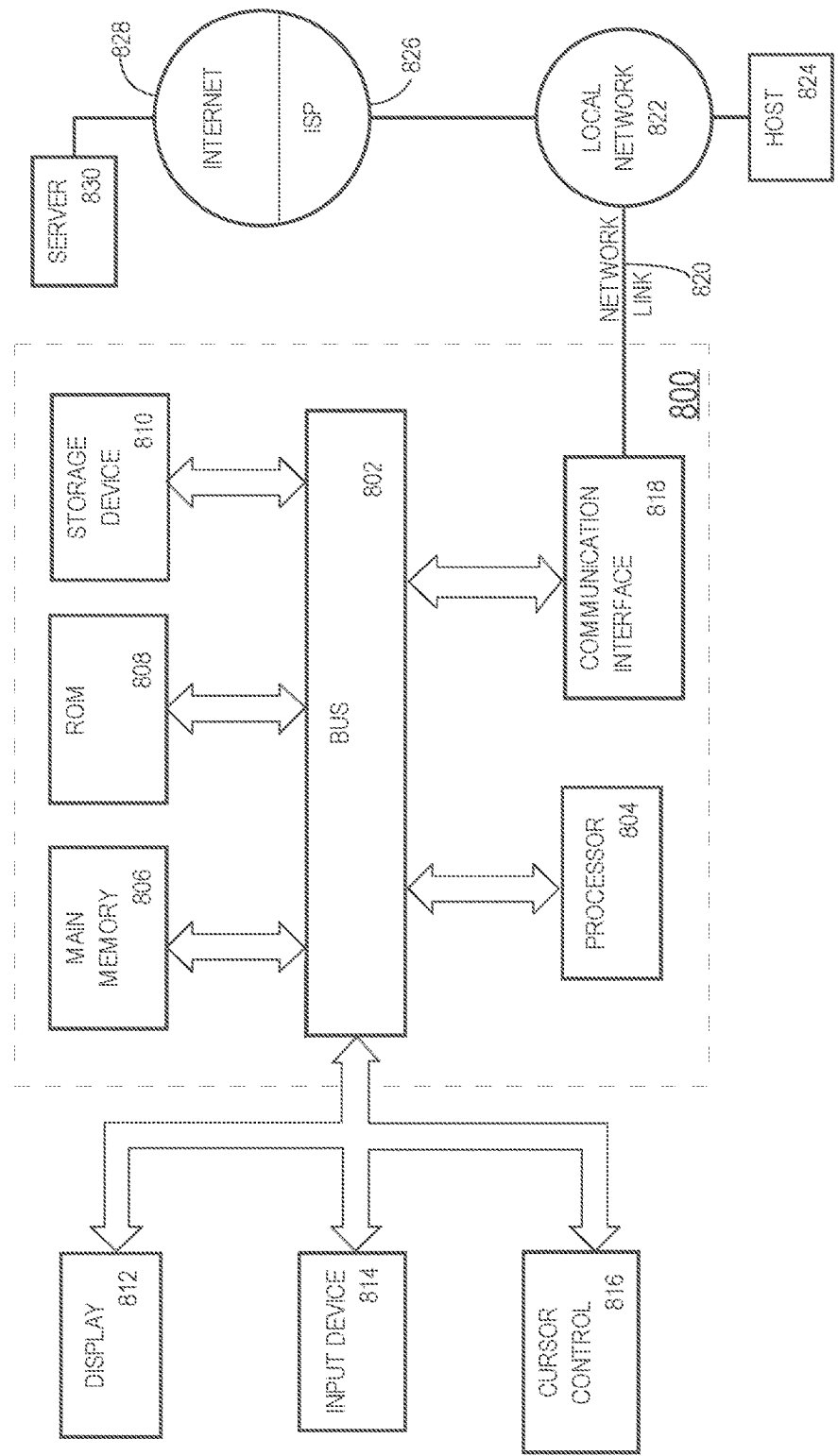
FIG. 8 is a diagram depicting a computer system that may be used in an embodiment.

FIG. 7 is a block diagram of a basic software system 700 that may be employed for controlling the operation of computing system 800 of FIG. 8. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 800. Software system 700, which may be stored in system memory (ROM) 808 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 810 into memory 806) for execution by the system 700. The applications or other software intended for use on computer system 800 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 46 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Computing Nodes and Clusters

A computing node is combination of one or more hardware processors that each share access to a byte addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. The one or more hardware processors may be running under the control of the same operating system A hardware processor may be comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating an integral image of an input image, comprising:
   splitting an input image into a first plurality of tiles;
   storing each of said first plurality of tiles in each scratch pad memory of a first plurality of scratchpad memories, wherein said each scratchpad memory of said plurality of scratchpad memories is connected to a respective core of a multi-core processor;
   at each core of said multi-core processor:
      determining a partial integral image of said tile over said tile;
      aggregating intermediate partial sums belonging to a subset of said first plurality of tiles;
      computing a final integral image of said tile over said input image by performing a summation over the aggregated intermediate partial sums;
   wherein, subsequent to each of said determining, said aggregating, and said computing, partial results are synchronized to shared memory.

2. The method of claim 1, wherein splitting an input image into a first plurality of tiles involves associating a row identifier and a column identifier for each tile of said plurality of tiles, wherein the row identifier and the column identifier for said each tile is associated with a row index and a column index in the input image for said tile.

3. The method of claim 2 wherein, for a particular tile of said first plurality of tiles,
   aggregating intermediate partial sums belonging to a subset of said first plurality of tiles, comprises:
      retrieving from shared memory and storing in scratchpad memory of particular core of said multi-core processor, row-vector values corresponding to all said first plurality of tiles of the input image that have the same column identifier as said particular tile, and column-vector values corresponding to all said first plurality of tiles of the input image that have the same row identifier as said particular tile;
      applying a two-dimensional inclusive parallel prefix sum algorithm over said row-vector values and said column-vector values to obtain respective row-vector partial sum and a column-vector partial sum; and
      storing, in shared memory, the respective row-vector partial sum and column vector partial sum in association with the row identifier and the column identifier of said particular tile.

4. The method of claim 3, wherein, for a particular tile of said first plurality of tiles, aggregating intermediate partial sums belonging to a subset of said first plurality of tiles, further comprises:

selecting one of either a row-vector partial sum or a column vector partial sum to be obtained from a previous stage of the two-dimensional parallel prefix sum algorithm; and retrieving, from shared memory, the selected either one of:
- a computed row-vector partial sum from a previous stage of the parallel prefix sum algorithm stored in shared memory; or
- a computed column-vector partial sum from a previous stage of the parallel prefix sum algorithm stored in shared memory.

5. The method of claim 4, wherein, for a particular tile of said first plurality of tiles, computing final integral image of said tile over said input image by performing a summation over the aggregated intermediate partial sums comprises:

applying a single-pass summation algorithm over the computed row-vector partial sum, the computed column-vector partial sum, and the selected either one of: the computed row-vector partial sum or the computed column-vector partial sum from a previous stage of the two-dimensional inclusive parallel prefix sum algorithm.

6. The method of claim 4, wherein said selecting is based on whether the row vector is shorter in dimension than the column vector.

7. The method of claim 3, wherein the two-dimensional inclusive parallel prefix sum algorithm is applied simultaneously over said row-vector values and said column-vector values.

8. The method of claim 1, wherein a size of each of said first plurality of tiles is based on one or more hardware constraints associated with said first plurality of scratchpad memories.

9. The method of claim 1, wherein said determining a partial integral image of said tile over said tile at a particular core comprises:

copying said input image tile into said partial integral image;
creating a temporary array for holding elements of a tile row;
at each row of said partial integral image,
starting from a second column element of said row, sequentially proceeding through each column element of said row until a last column element of said row, and updating a value at the column element by adding the value of the partial integral image at a previous column element of said row;
except when said row is a first row, updating a value of each column element in said row by adding the value of the same column element of a previous row, wherein said previous row is in temporary array; and
copying each column element in said row to a corresponding column element in said temporary array; and
upon completion of all the rows, storing the elements of the partial integral image of said tile in a row-major format in shared memory.

10. The method of claim 1, wherein said first plurality of tiles are stored in shared memory in row major order, and each tile of said plurality of tiles is in contiguous shared memory.

11. One or more non-transitory computer-readable storage media storing instructions, which when executed by one or more computing devices, cause:

splitting an input image into a first plurality of tiles;
storing each of said first plurality of tiles in each scratch pad memory of a first plurality of scratchpad memories, wherein said each scratchpad memory of said plurality of scratchpad memories is connected to a respective core of a multi-core processor;
at each core of said multi-core processor:
determining a partial integral image of said tile over said tile;
aggregating intermediate partial sums belonging to a subset of said first plurality of tiles;
computing a final integral image of said tile over said input image by performing a summation over the aggregated intermediate partial sums;
wherein, subsequent to each of said determining, said aggregating, and said computing, partial results are synchronized to shared memory.

12. The non-transitory computer-readable storage medium of claim 11, wherein splitting an input image into a first plurality of tiles involves associating a row identifier and a column identifier for each tile of said plurality of tiles, wherein the row identifier and the column identifier for said each tile is associated with a row index and a column index in the input image for said tile.

13. The non-transitory computer-readable storage medium of claim 12 wherein, for a particular tile of said first plurality of tiles, aggregating intermediate partial sums belonging to a subset of said first plurality of tiles, comprises:

retrieving from shared memory and storing in scratchpad memory of particular core of said multi-core processor, row-vector values corresponding to all said first plurality of tiles of the input image that have the same column identifier as said particular tile, and column-vector values corresponding to all said first plurality of tiles of the input image that have the same row identifier as said particular tile;
applying a two-dimensional inclusive parallel prefix sum algorithm over said row-vector values and said column-vector values to obtain respective row-vector partial sum and a column-vector partial sum; and
storing, in shared memory, the respective row-vector partial sum and column vector partial sum in association with the row identifier and the column identifier of said particular tile.

14. The non-transitory computer-readable storage medium of claim 13, wherein, for a particular tile of said first plurality of tiles, aggregating intermediate partial sums belonging to a subset of said first plurality of tiles, further comprises:

selecting one of either a row-vector partial sum or a column vector partial sum to be obtained from a previous stage of the two-dimensional parallel prefix sum algorithm; and
retrieving, from shared memory, the selected either one of:
a computed row-vector partial sum from a previous stage of the parallel prefix sum algorithm stored in shared memory; or
a computed column-vector partial sum from a previous stage of the parallel prefix sum algorithm stored in shared memory.

15. The non-transitory computer-readable storage medium of claim 14, wherein, for a particular tile of said first plurality of tiles, computing final integral image of said tile over said input image by performing a summation over the aggregated intermediate partial sums comprises:

applying a single-pass summation algorithm over the computed row-vector partial sum, the computed column-vector partial sum, and the selected either one of: the computed row-vector partial sum or the computed column-vector partial sum from a previous stage of the two-dimensional inclusive parallel prefix sum algorithm.

16. The non-transitory computer-readable storage medium of claim 14, wherein said selecting is based on whether the row vector is shorter in dimension than the column vector.

17. The non-transitory computer-readable storage medium of claim 13, wherein the two-dimensional inclusive parallel prefix sum algorithm is applied simultaneously over said row-vector values and said column-vector values.

18. The non-transitory computer-readable storage medium of claim 11, wherein a size of each of said first plurality of tiles is based on one or more hardware constraints associated with said first plurality of scratchpad memories.

19. The non-transitory computer-readable storage medium of claim 11, wherein said determining a partial integral image of said tile over said tile at a particular core comprises:
    copying said input image tile into said partial integral image;
    creating a temporary array for holding elements of a tile row;
    at each row of said partial integral image,
        starting from a second column element of said row, sequentially proceeding through each column element of said row until a last column element of said row, and updating a value at the column element by adding the value of the partial integral image at a previous column element of said row;
        except when said row is a first row, updating a value of each column element in said row by adding the value of the same column element of a previous row, wherein said previous row is in temporary array; and
        copying each column element in said row to a corresponding column element in said temporary array; and
    upon completion of all the rows, storing the elements of the partial integral image of said tile in a row-major format in shared memory.

20. The non-transitory computer-readable storage medium of claim 11, wherein said first plurality of tiles are stored in shared memory in row major order, and each tile of said plurality of tiles is in contiguous shared memory.

* * * * *